US012255867B2

(12) United States Patent
Prabhakaran et al.

(10) Patent No.: US 12,255,867 B2
(45) Date of Patent: Mar. 18, 2025

(54) LKG CLIENT CACHE FOR DNS RESILIENCY

(71) Applicant: Microsoft Technology Licensing, LLC, Redmond, WA (US)

(72) Inventors: Vinothkumar Prabhakaran, Bangalore (IN); Srikanth Subramanian, Snohomish, WA (US); Kiran Kumar Venkata Purna Chenna Kesava Vemula, Hyderabad (IN); Arpan Kumar Gupta, Bangalore (IN); Aditya Sharma, Gujarat (IN); Peter Alan Carlin, Seattle, WA (US); Ivan Dimitrov Pashov, Woodinville, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 14 days.

(21) Appl. No.: 17/743,312

(22) Filed: May 12, 2022

(65) Prior Publication Data

US 2023/0370418 A1 Nov. 16, 2023

(51) Int. Cl.
*H04L 61/4511* (2022.01)
*H04L 61/5053* (2022.01)
*H04L 61/58* (2022.01)

(52) U.S. Cl.
CPC ...... *H04L 61/4511* (2022.05); *H04L 61/5053* (2022.05); *H04L 61/58* (2022.05)

(58) Field of Classification Search
CPC . H04L 61/4511; H04L 61/5053; H04L 61/58; H04L 12/4633; H04L 61/2503; H04L 61/2514; G06F 12/0808; G06F 12/128; G06F 2212/604
See application file for complete search history.

(56) References Cited

U.S. PATENT DOCUMENTS

| 7,567,582 | B2 * | 7/2009 | Westhead | H04L 61/4511 370/428 |
| 8,996,653 | B1 * | 3/2015 | Eriksen | H04L 61/58 709/217 |
| 9,215,205 | B1 * | 12/2015 | Smith | H04L 63/101 |
| 10,180,914 | B2 * | 1/2019 | Hulick | G06F 12/128 |
| 11,025,482 | B2 * | 6/2021 | Huque | H04L 61/5076 |

(Continued)

OTHER PUBLICATIONS

Lawrence, et al., "Serving Stale Data to Improve DNS Resiliency", In Journal of Request for Comments, vol. 8767, Mar. 2020, 7 Pages.

(Continued)

*Primary Examiner* — Alex H. Tran
(74) *Attorney, Agent, or Firm* — Workman Nydegger

(57) ABSTRACT

Techniques for implementing a last known good (LKG) client-side cache for DNS resiliency are disclosed. A first DNS request is submitted to a DNS server. A first DNS resolution that resolves an IP address for a domain name is received. A service stores the first DNS resolution in an LKG cache residing on the local host. A second DNS request is sent, where the second DNS request again requests to resolve the same domain name. In response to determining that a second DNS resolution for the second DNS request has not been received, the service obtains the IP address for the domain name from the LKG cache.

20 Claims, 6 Drawing Sheets

(56) References Cited

U.S. PATENT DOCUMENTS

| | | |
|---|---|---|
| 11,362,950 B2 * | 6/2022 | Dillon ................. H04L 61/4511 |
| 11,570,142 B2 * | 1/2023 | Uchikawa ........... H04L 61/4552 |
| 2010/0274970 A1 | 10/2010 | Treuhaft et al. |
| 2010/0332680 A1 | 12/2010 | Anderson et al. |
| 2011/0202793 A1 | 8/2011 | Xu |
| 2015/0288648 A1 * | 10/2015 | Seo .................... H04L 61/4511 |
| | | 709/245 |
| 2017/0289033 A1 * | 10/2017 | Singh ..................... H04L 61/58 |
| 2020/0117608 A1 * | 4/2020 | Thompto ............ G06F 12/0811 |
| 2020/0287985 A1 | 9/2020 | Sinha et al. |
| 2022/0014595 A1 * | 1/2022 | Lee ......................... H04L 63/10 |

OTHER PUBLICATIONS

"International Search Report and Written Opinion Issued in PCT Application No. PCT/US23/013376", Mailed Date: Apr. 25, 2023, 10 pages.

* cited by examiner

LKG CLIENT CACHE FOR DNS RESILIENCY

BACKGROUND

The acronym DNS stands for "Domain Name System." DNS refers to a system that translates or maps human recognizable domain names (e.g., www.test1.com) into computer-readable Internet Protocol (IP) addresses (e.g., 192.313.23.13). When one computing device (e.g., a smart phone, tablet, smart watch, laptop, desktop, etc.) communicates with another computing device, those devices rely on IP addresses. From a human perspective, however, it is much easier to remember and to use domain names instead of IP addresses. Thus, DNS provides a technique for storing mappings between domain names and IP addresses.

Generally, there are two different types of DNS services. These services include an authoritative DNS and a recursive DNS. An authoritative DNS is a type of service that has the final authority or the baseline truth for a particular domain name. An authoritative DNS has the responsibility for providing the IP address information to a recursive DNS.

Client devices typically do not communicate directly with an authoritative DNS; instead, they typically communicate directly with a recursive DNS, which then communicates with the authoritative DNS. In this regard, the recursive DNS often operates as an intermediary between the client device and the authoritative DNS.

A client device (e.g., a local host) is typically configured with a DNS client. The DNS client communicates with a DNS server, which can be the recursive DNS or (potentially) the authoritative DNS. When a user interacts with an application on the local host, the user will typically enter a domain name. The DNS client receives this domain name and prepares a DNS request, which is transmitted to the DNS server. The DNS request includes a request for the DNS server to "resolve" the IP address for the domain name the user provided. By "resolve," it is meant that the DNS client is requesting the IP address for this particular domain name. The DNS server will return the IP address for the domain name. This response is referred to as a DNS resolution.

Sometimes, a situation may occur where a DNS resolution is not available for the DNS client. When such a failure condition occurs (i.e. when a DNS resolution is not available), traditional DNS failover techniques include an active-active failover and/or an active-passive failover. With an active-active failover, all of the records having the same routing policy and the same name are listed as active. With the active-passive failover, only the healthy primary resources are active.

When a DNS failure occurs, this failure can have a significant impact on not only the requesting application but on other applications on the local host as well as other client devices. What is needed, therefore, is an improved technique for handling DNS failure scenarios.

The subject matter claimed herein is not limited to embodiments that solve any disadvantages or that operate only in environments such as those described above. Rather, this background is only provided to illustrate one exemplary technology area where some embodiments described herein may be practiced.

BRIEF SUMMARY

Embodiments disclosed herein relate to systems, devices, and methods for implementing a last known good (LKG) client-side cache for domain name system (DNS) resiliency. The disclosed techniques can be performed by a local host implementing a DNS client.

Some embodiments submit a first DNS request to a DNS server, where the first DNS request is a request for the DNS server to resolve an Internet Protocol (IP) address for a domain name that is included in the first DNS request. The embodiments receive, from the DNS server, a first DNS resolution that resolves the IP address for the domain name. A service is then triggered. This service stores the first DNS resolution in an LKG cache residing on the local host. Optionally, prior to storing the first DNS resolution in the LKG cache, the service can query the LKG cache to determine whether an existing DNS resolution is already stored in the LKG cache for the IP address and the domain name.

The embodiments submit a second DNS request to the DNS server, where the second DNS request is a subsequent request for the DNS server to again resolve the IP address for the domain name, which is included in the second DNS request. In response to determining that a second DNS resolution for the second DNS request has not been received from the DNS server, the service is again triggered to obtain the IP address for the domain name from the LKG cache residing on the local host. The embodiments then use the IP address, which was obtained from the LKG cache, to connect the local host with a system associated with the IP address.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Additional features and advantages will be set forth in the description which follows, and in part will be obvious from the description, or may be learned by the practice of the teachings herein. Features and advantages of the invention may be realized and obtained by means of the instruments and combinations particularly pointed out in the appended claims. Features of the present invention will become more fully apparent from the following description and appended claims, or may be learned by the practice of the invention as set forth hereinafter.

BRIEF DESCRIPTION OF THE DRAWINGS

In order to describe the manner in which the above-recited and other advantages and features can be obtained, a more particular description of the subject matter briefly described above will be rendered by reference to specific embodiments which are illustrated in the appended drawings. Understanding that these drawings depict only typical embodiments and are not therefore to be considered to be limiting in scope, embodiments will be described and explained with additional specificity and detail through the use of the accompanying drawings in which.

DETAILED DESCRIPTION

Figure 1:
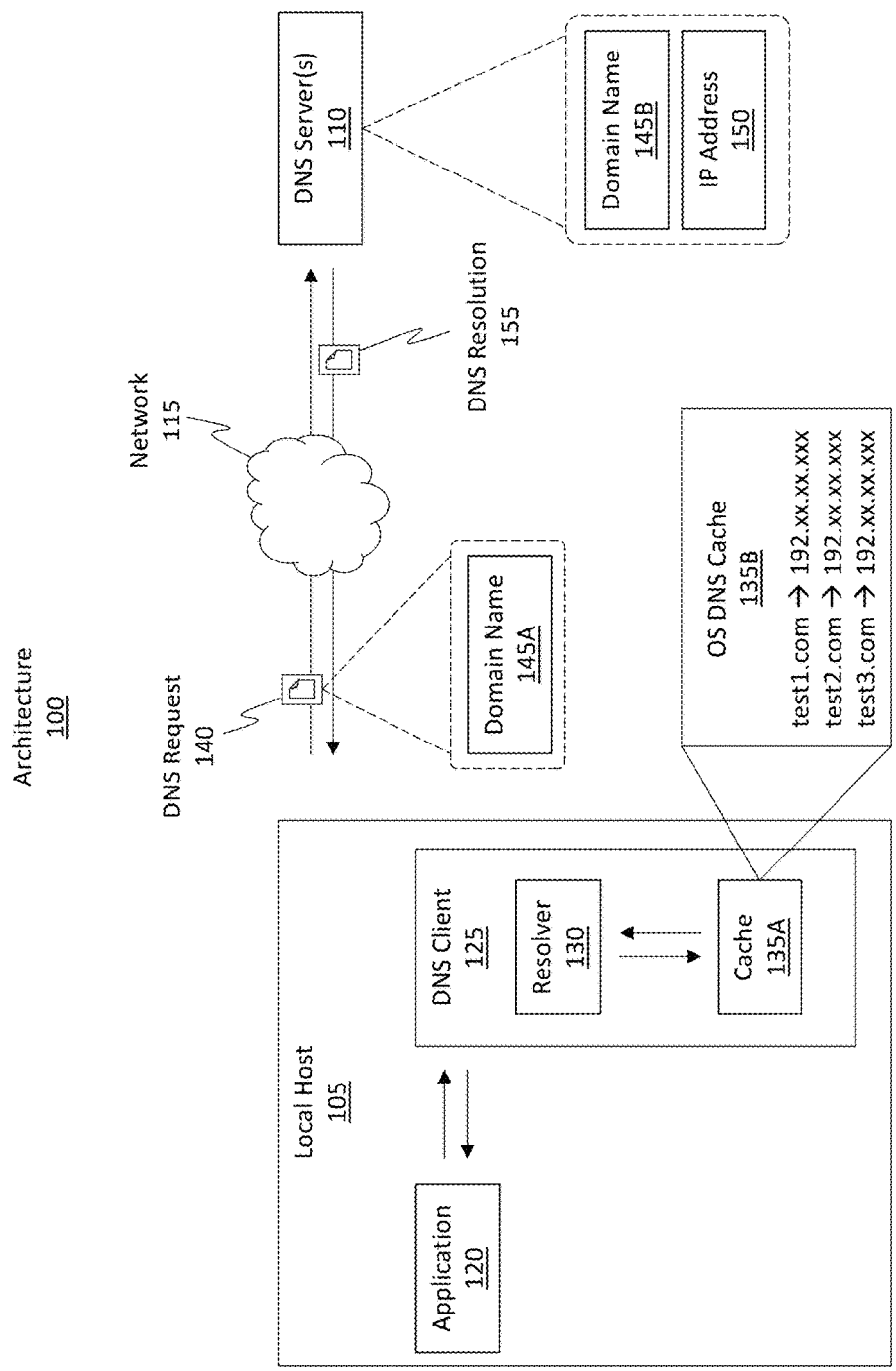
FIG. 1 illustrates an example architecture that can be used to resolve IP addresses for domain names.

Embodiments disclosed herein relate to systems, devices, and methods for implementing a last known good (LKG) client-side cache for DNS resiliency. The disclosed techniques can be performed by a local host implementing a DNS client.

Some embodiments submit a first DNS request to a DNS server, where the first DNS request is a request for the DNS server to resolve an IP address for a domain name that is included in the first DNS request. The embodiments receive a first DNS resolution that resolves the IP address for the domain name. A service then stores the first DNS resolution in an LKG cache residing on the local host. The embodiments submit a second DNS request, where the second DNS request is a subsequent request for the DNS server to again resolve the IP address for the domain name. In response to determining that a second DNS resolution for the second DNS request has not been received, the service obtains the IP address for the domain name from the LKG cache. The embodiments then use the obtained IP address to connect the local host with a system associated with the IP address.

Examples of Technical Benefits, Improvements, and Practical Applications

The following section outlines some example improvements and practical applications provided by the disclosed embodiments. It will be appreciated, however, that these are just examples only and that the embodiments are not limited to only these improvements.

The disclosed embodiments significantly improve the technical field of DNS failure handling. In particular, the embodiments present a client-side and operating system (OS)-based technique for handling DNS failure conditions. By enabling the disclosed operations to be performed on a client device, the embodiments significantly improve the speed by which DNS resolutions can be provided (e.g., by reducing network congestion) under failure scenarios. Additionally, by embedding the disclosed service as a dynamic link library (DLL) with the local host's operating system (OS), the embodiments enable the service to be elevated (in terms of priority) and to override various other fallback operations (e.g., the active-active or active-passive techniques mentioned earlier).

Accordingly, in order to eliminate DNS resolution failure issues, DNS Last Known Good (LKG) resolution comes into picture, where if there is a delay in getting DNS resolution, the last successful answer from the DNS server is used. A DNS cache plug-in (i.e. the disclosed "service") kicks in when there is a delay in response from the DNS servers. The DNS cache plug-in implements a Least Recently Used (LRU) cache that runs within the DNS client service and that will provide the last known good DNS resolution to a query when there is a DNS look up failure. The solution provides flexibility with additional options like persistency across reboot, sticky entries, domain whitelisting, hierarchical storage entries for queries, asynchronous use case, and manipulation of cache entries.

In this manner, the disclosed embodiments bring about numerous benefits. These benefits as well as many others will now be discussed in more detail throughout the remaining portions of this disclosure.

Example Architectures for DNS Resolution

Attention will now be directed to FIG. 1, which illustrates an architecture 100 comprising a local host 105 and one or more DNS server(s) 110. The local host 105 and the DNS server(s) 110 are able to communicate with one another via a network 115.

The local host 105 is shown as including an application 120, which can be any type of application, without limit. Examples of applications include, but certainly are not limited to, any type of web browser or any type of application that may use domain names to access content over a network. The local host 105 is shown as also including a DNS client 125. Notably, the application 120 can communicate and interact with the DNS client 125 in an attempt to resolve domain names.

As used herein, the term "resolve" (and its variants, such as "resolution") refers to a scenario where a domain name (e.g., www.test1.com) is converted or is mapped to an Internet Protocol (IP) address, such as 192.125.22.54. In other words, the term "resolve" refers to a mapping process where a domain name is linked with a corresponding IP address. The DNS client 125 can communicate with the DNS server(s) 110 to resolve a domain name, as will be described in more detail shortly.

The DNS client 125 includes a service, such as a resolver 130. The resolver 130 can communicate with a local cache 135A, which can optionally be an operating system (OS) DNS cache 135B. The cache 135A is typically a short-lived cache, meaning that entries included in the cache 135A are typically not persistently stored. For instance, the entries in the cache 135A might have time to live (TTL) characteristics associated with them, such that they expire after a period of time.

In some cases, when the application 120 requests an IP address for a domain name, the DNS client 125 may first query the cache 135A to determine whether the IP address for the domain name is already resolved in the cache 135A. Doing so can help reduce network traffic as well as speed up the process for resolving the domain name. If the cache 135A does not include the requested resolution information, then the DNS client 125 can submit a DNS request 140 to the DNS server(s) 110, which include the baseline mapping between domain names and IP addresses.

The DNS request 140 includes the domain name 145A and a request to resolve that domain name 145A. The DNS request 140 is transmitted to the DNS server(s) 110 over the network 115. The DNS server(s) 110 receive the DNS request 140, extract the domain name 145B, which corresponds to the domain name 145A, and determines a corresponding IP address 150 for that domain name 145B. The DNS server(s) 110 then return a DNS resolution 155 to the DNS client 125, where the DNS resolution 155 includes the resolution, or mapping, between the domain name 145B and the IP address 150. That is, the DNS resolution 155 includes information indicating that the domain name 145B is mapped to the IP address 150. The DNS client 125 receives the resolution information and provides the IP address 150 to the application 120. The application 120 can then use the IP address 150 to connect to whatever device has that IP address 150.

Traditionally, when an error occurred with the above-described process, traditional systems used resiliency measures such as active-passive deployments or perhaps active-active deployments in an attempt to resolve the IP address for a domain name. The disclosed embodiments, however, are configured in a different manner. That is, when a failure scenario occurs (i.e. for whatever reason the DNS server(s) 110 are not able to provide the DNS resolution 155 to the DNS client 125), various aspects of the disclosed principles are triggered. Accordingly, attention will now be directed to FIG. 2, which provides a useful illustration regarding how the disclosed embodiments operate.

Storing DNS Resolutions

Figure 2:
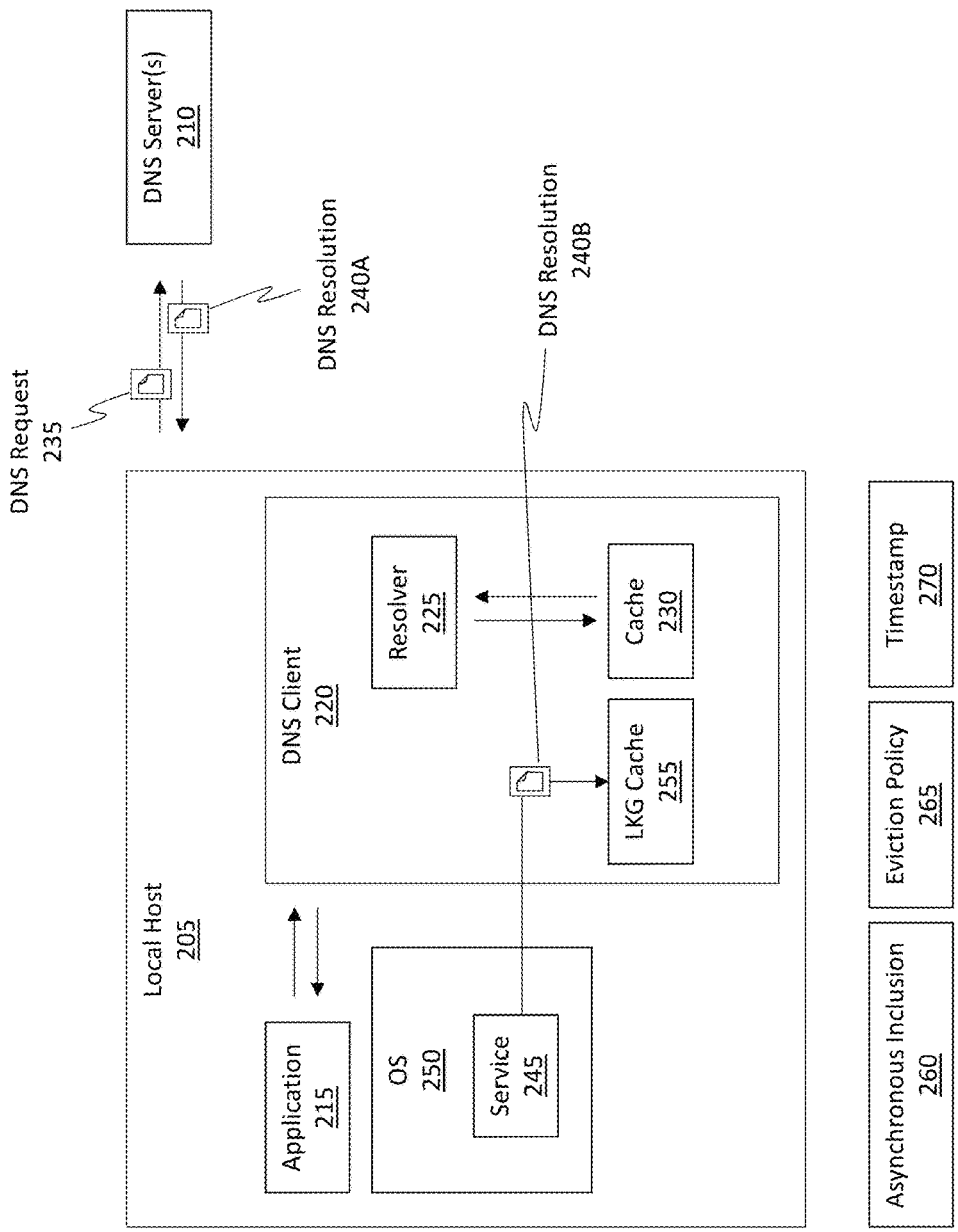
FIG. 2 illustrates an improved architecture for resolving IP addresses for domain names.

FIG. 2 shows an improved architecture 200 relative to the architecture 100 of FIG. 1. Architecture 200 is shown as including a local host 205 and one or more DNS server(s) 210. Although not illustrated, the local host 205 communicates with the DNS server(s) 210 over a network, like the network 115 of FIG. 1.

The local host 205 includes an application 215 and a DNS client 220. The DNS client 220 includes a resolver 225 and a cache 230, which are representative of the resolver 130 and cache 135A from FIG. 1.

As described previously, the application 215 may request to resolve an IP address for a domain name, thereby triggering the DNS client 220. The DNS client 220 generates a DNS request 235 and transmits that DNS request 235 to the DNS server(s) 210. The DNS server(s) 210 resolve the IP address for the domain name and return a DNS resolution 240A, which includes the IP address for the domain name. The DNS client 220 can optionally store the resolved IP address in the cache 230 in the manner described previously.

In contrast with the architecture 100 of FIG. 1, architecture 200 shows the local host 205 as including an additional component, namely, the service 245. In some cases, the service 245 can be a dynamic link library (DLL) that is embedded in an operating system (OS) 250 of the local host 205.

In some cases, the service 245 is triggered each time DNS resolution information is received from the DNS server(s) 210. The service 245 is able to obtain the DNS resolution 240A and store that information (e.g., as shown by DNS resolution 240B) in what is referred to herein as a "Last Known Good" (LKG) cache 255. Notice, the LKG cache 255 is distinct and separate from the cache 230, which is typically an OS DNS cache.

Each time DNS resolution information is received from the DNS server(s) 210, the service 245 is triggered to store a copy of that information in the LKG cache 255. In some cases, the LKG cache 255 may have an existing resolution entry for a particular domain name. The service 245 is able to compare the existing resolution information against the newly acquired resolution information. If the two pieces of information differ, then the service 245 replaces the existing resolution information in the LKG cache 255 with the newly acquired resolution information. In this manner, the LKG cache 255 can be referred to as a least recently used (LRU) cache, where only the most up-to-date resolution information is stored. That is, the embodiments replace stale resolution information with new resolution information. On the other hand, if the two pieces of information are the same, the service 245 can optionally update a timestamp for the existing resolution information in order to indicate that the stored information is refreshed and is not stale.

Notably, the LKG cache 255 can be persistent storage (i.e. a persistent cache). What this means is that the entries in the LKG cache 255 will persist even if the local host 205 is turned off or rebooted.

In addition to storing resolution information when DNS resolutions are received from the DNS server(s) 210, the service 245 also permits asynchronous inclusion 260 of DNS resolutions into the LKG cache 255. As an example, a user can use the service 245 to independently and asynchronously add IP addresses for domain names in the LKG cache 255. Stated differently, resolutions between IP addresses and domain names are addable asynchronously to the LKG cache, and the LKG cache can be asynchronously hydrated with resolutions between IP addresses and domain names.

In some embodiments, the service 245 may maintain an eviction policy 265 for the LKG cache 255. Each entry in the LKG cache 255 can be provided with its own corresponding timestamp 270. If the age of the timestamp 270 exceeds an age as determined by the eviction policy 265, then that entry can be removed from the LKG cache 255. Often, entries are permitted to exist in the LKG cache 255 for up to five days (i.e. the threshold time period is 5 days). Of course, other thresholds can be used, and the 5 day setting is just one example. After an entry is 5 days old (without its timestamp being updated, as mentioned previously), then that entry can be removed from the LKG cache 255.

Figure 3:
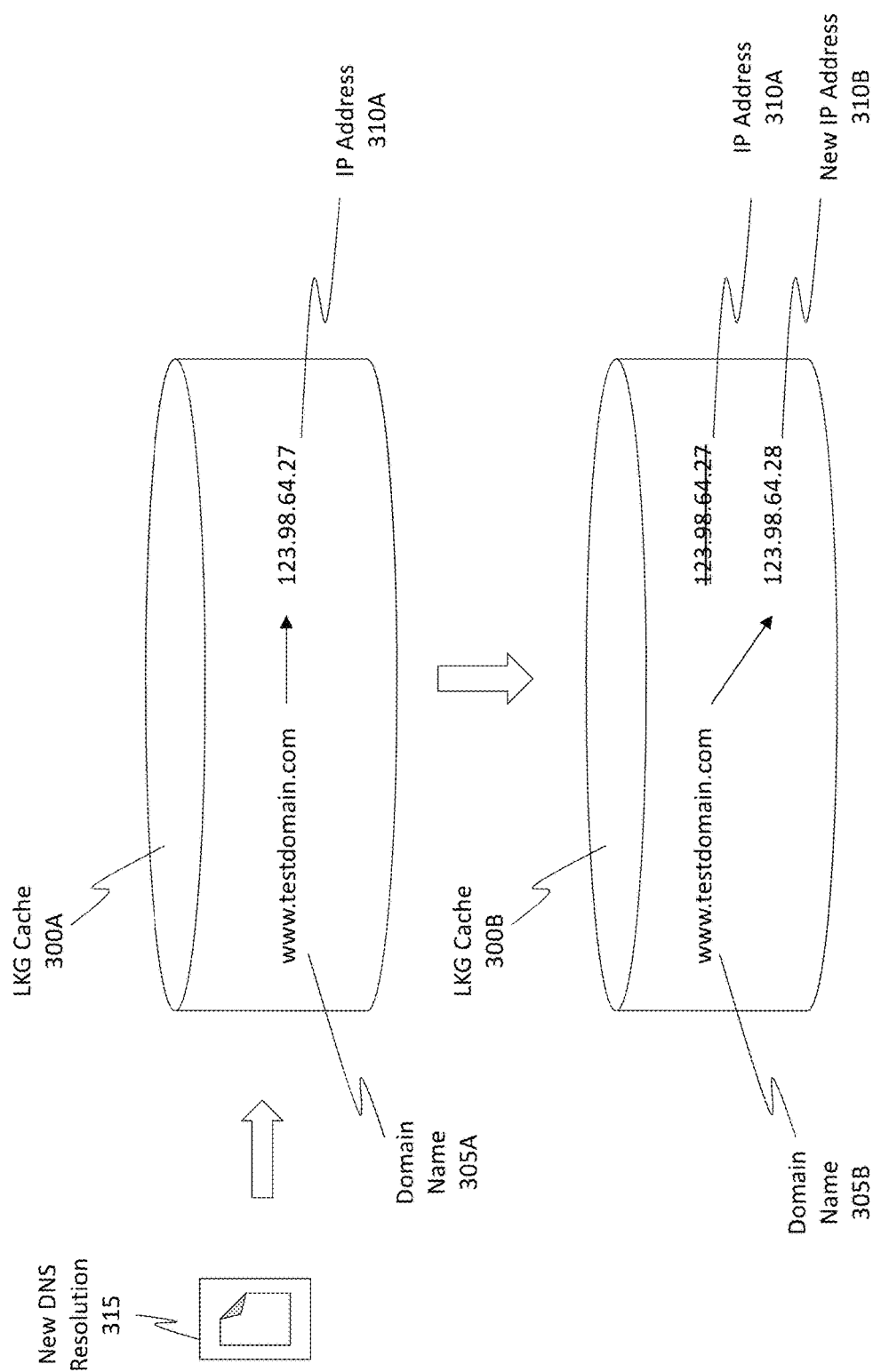
FIG. 3 illustrates an example of a last known good (LKG) cache.

Accordingly, in some embodiments, an eviction policy is provided for the LKG cache, where the eviction policy governs how frequently entries in the LKG cache are evicted. In some cases, a timestamp is provided for each DNS resolution included in the LKG cache, and the eviction policy relies on these timestamps. FIG. 3 shows some additional details regarding the LKG cache.

FIG. 3 shows an LKG cache 300A, which is representative of the LKG cache 255 from FIG. 2. Notice, the LKG cache 300A includes resolution information for a domain name 305A. Specifically, the LKG cache 300A includes a mapping between the domain name 305A and an IP address 310A. The mapping between the domain name 305A and the IP address 310A constitutes "resolution information" and is considered to be existing or original resolution information.

Later, a new DNS resolution 315 is received by the service, where this new DNS resolution 315 corresponds to the domain name 305A.

The service updates the LKG cache with the new DNS resolution 315, as shown by the updated LKG cache 300B. Notice, the new IP address 310B, which was included in the new DNS resolution 315, is used to replace the old IP address 310A for the domain name 305B, which corresponds to the domain name 305A. The old IP address 310A can be deleted from the LKG cache 300B. In this regard, only fresh resolution information is stored in the LKG cache, and stale information can be expunged or deleted.

DNS Resolutions Under Error Conditions

With the architecture 200 of FIG. 2, the embodiments are able to store DNS resolutions when responses from DNS servers are received. These storing actions can be considered as preparatory actions for when DNS resolutions cannot be received from the DNS server(s).

Figure 4:
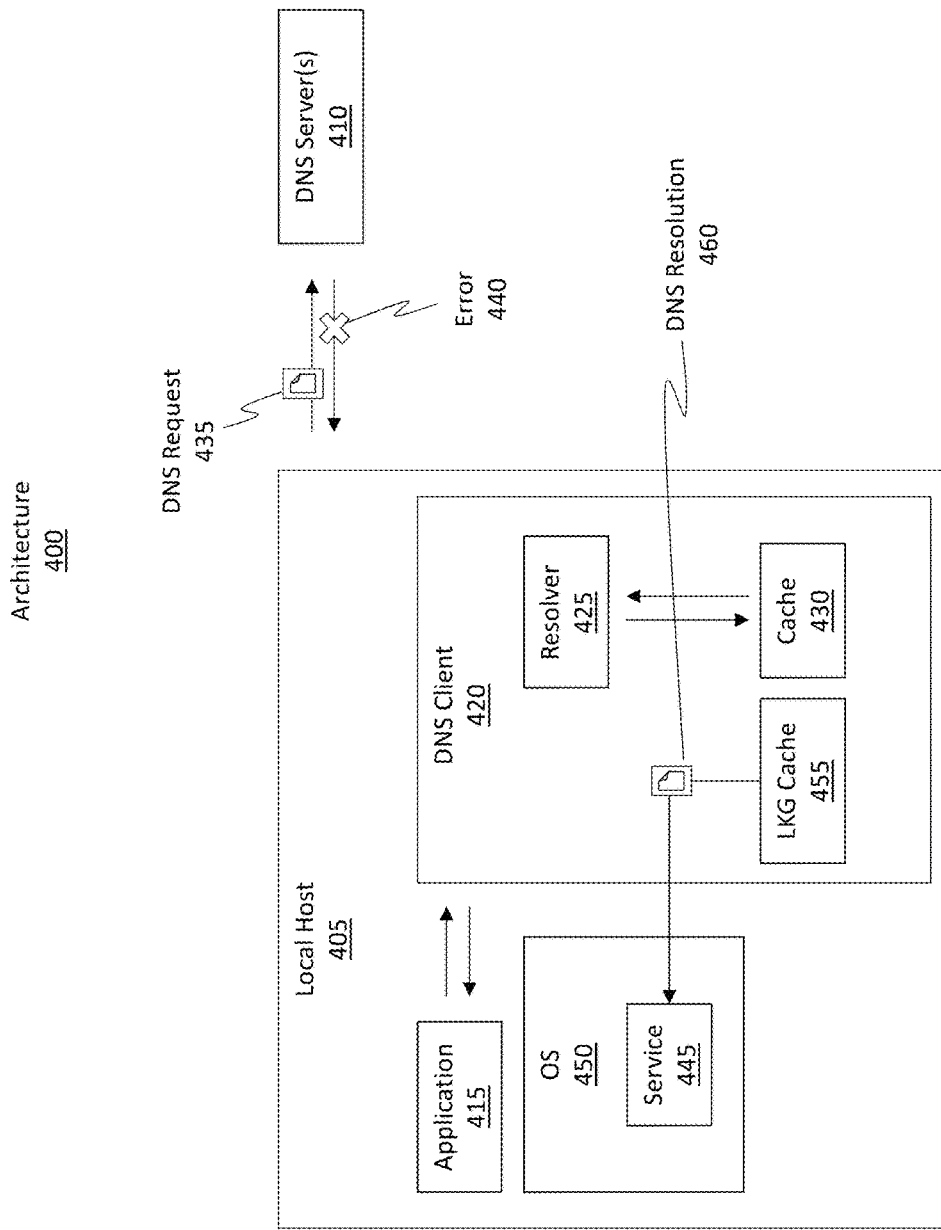
FIG. 4 illustrates how the architecture can be used when a DNS resolution is not obtained from one or more DNS server(s).

There may be various different reasons as to why a response from the DNS server(s) is not returned. In some cases, a timeout condition may be reached, and a timeout error is received by the local host from the DNS server. In some cases, there may be reachability issues with regard to reaching or connecting with the DNS server(s). In some cases, a response failure may have occurred, or perhaps a configuration error has occurred. In any event, there may be any number of reasons as to why the DNS client may not receive a DNS resolution in response to a DNS request. The disclosed embodiments are configured to operate in response to these error conditions, or failure pathways. Whereas traditional systems follow the active-passive or active-active deployments, the disclosed embodiments follow a different pathway when confronted with an error or no response scenario from the DNS server(s). FIG. 4 is illustrative.

FIG. 4 shows an architecture 400, which is representative of the architecture 200 from FIG. 2. The architecture 400 includes a local host 405, one or more DNS server(s) 410, the DNS client 420, the resolver 425, and the cache 430.

The DNS client 420 submits a DNS request 435 to the DNS server(s) 410. Instead of receiving a DNS resolution, however, an error 440 is returned or received. In response to this error 440, the service 445 is triggered. Recall, the service 445 can be an OS 450 DLL.

The service 445 uses the domain name that was included in the DNS request 435 to consult the LKG cache 455. If the LKG cache 455 includes a DNS resolution 460 for that domain name, then the LKG cache 455 returns the DNS resolution 460. The LKG cache 455 might include the DNS resolution 460 if that domain name was previously used by the local host 405, or perhaps by the application 415, or perhaps was asynchronously added. That is, the LKG cache 455 may have been populated with the DNS resolution 460 at a previous time, as was described by the scenario presented in FIG. 2.

Therefore, even if the DNS server(s) 410 are not reachable, the embodiments can still provide a DNS resolution 460 for a requested domain name. The DNS resolution 460 can be stored and accessed locally on the local host 405.

Example Methods

The following discussion now refers to a number of methods and method acts that may be performed. Although the method acts may be discussed in a certain order or illustrated in a flow chart as occurring in a particular order, no particular ordering is required unless specifically stated, or required because an act is dependent on another act being completed prior to the act being performed.

Figure 5:
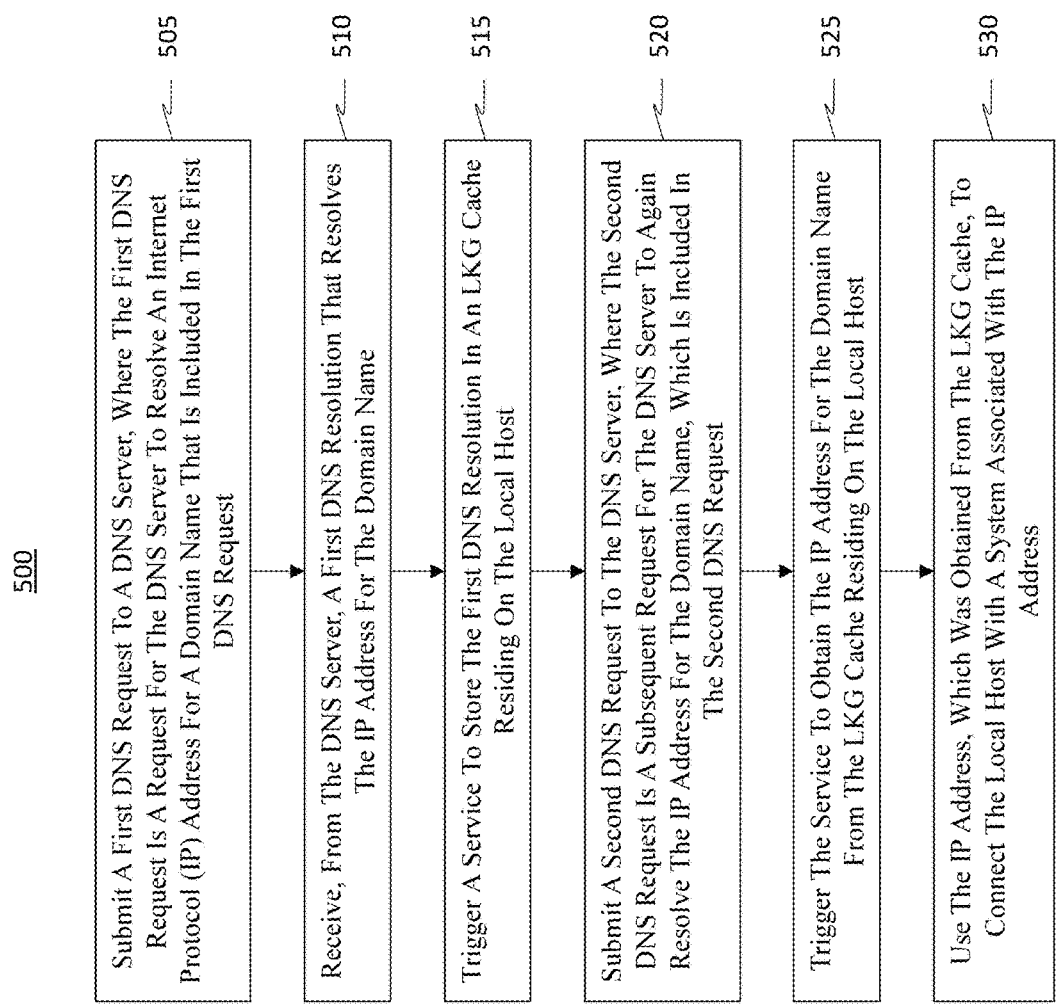
FIG. 5 illustrates a flowchart of an example method for resolving IP addresses for domain names.

Attention will now be directed to FIG. 5, which illustrates a flowchart of an example method 500 for implementing a last known good (LKG) client-side cache for domain name system (DNS) resiliency. Method 500 can be performed by a local host implementing a DNS client, such as the local host 205 of FIG. 2 and/or the local host 405 of FIG. 4.

Method 500 includes an act (act 505) of submitting a first DNS request to a DNS server, where the first DNS request is a request for the DNS server to resolve an Internet Protocol (IP) address for a domain name that is included in the first DNS request. For example, the DNS request 235 of FIG. 2 can be considered this "first" DNS request.

Act 510 includes receiving, from the DNS server, a first DNS resolution that resolves the IP address for the domain name. The DNS resolution 240A of FIG. 2 can be considered as this "first" DNS resolution.

Act 515 includes triggering a service (e.g., service 245 of FIG. 2) to store the first DNS resolution in an LKG cache (e.g., LKG cache 255) residing on the local host. In some cases, prior to storing the first DNS resolution in the LKG cache, the service queries the LKG cache to determine whether an existing DNS resolution is already stored in the LKG cache for the IP address and the domain name. If there is an existing DNS resolution, then the service can perform a comparison to determine whether the existing DNS resolution is the same as the first DNS resolution. If they are the same, then the service can update the timestamp of the existing DNS resolution to refresh it by setting the timestamp to a current timestamp reflective of a time when the first DNS resolution was received. On the other hand, if they are different, then the service can replace the existing DNS resolution in the LKG cache with the first DNS resolution.

In other words, causing the first DNS resolution to be stored in the LKG cache on the local host can include the service determining that an existing DNS resolution is already stored in the LKG cache. Upon determining that the existing DNS resolution is the same as the first DNS resolution, the service updates a timestamp for the existing DNS resolution in the LKG cache. Upon determining that the existing DNS resolution is different than the first DNS resolution, the service replaces the existing DNS resolution in the LKG cache with the first DNS resolution.

Act 520 includes submitting a second DNS request to the DNS server, where the second DNS request is a subsequent request for the DNS server to again resolve the IP address for the domain name, which is included in the second DNS request. The DNS request 435 of FIG. 4 can be considered this "second" DNS request.

As described previously, in addition to the LKG cache, the local host includes an additional cache (e.g., cache 430 of FIG. 4) that temporarily stores DNS resolutions. As mentioned above, prior to submitting the second DNS request to the DNS server, the embodiments (and more specifically the service) can query the additional cache to determine whether the additional cache includes the IP address for the domain name.

In response to determining that a second DNS resolution for the second DNS request has not been received from the DNS server (e.g., perhaps in response to the error 440 of FIG. 4), act 525 includes triggering the service to obtain the IP address for the domain name from the LKG cache residing on the local host. The process of determining that the second DNS resolution for the second DNS request has not been received from the DNS server can include one or more of: determining a reachability issue exists with regard to reaching the DNS server; determining a response failure has occurred; determining a response delay has occurred; or determining a configuration error has occurred.

The service 445 of FIG. 4 fetches or otherwise obtains the DNS resolution 460 from the LKG cache 455. The DNS resolution 460 can be the same as the DNS resolution 240A or the DNS resolution 240B of FIG. 2. That is, this DNS resolution was successfully obtained at a prior instance in time. If, however, the LKG cache does not include the proper DNS resolution, then traditional fallback failure mechanisms can be followed.

The service can be a DLL that is embedded in an OS of the local host. The DLL can be invoked in response to determining that the second DNS resolution for the second DNS request has not been received. Furthermore, the DLL can obtain the IP address for the domain name from the LKH cache. In some cases, the service may be triggered to obtain the IP address for the domain name from the LKG cache only in response to the determination that the second DNS resolution for the second DNS request has not been received. That is, consulting the LKG cache can be performed only in response to a failure condition whereas consulting the additional cache can be performed during the initial request process (i.e. before a failure condition has occurred).

The process of determining that the second DNS resolution for the second DNS request has not been received from the DNS server can be based on receiving an error message from the DNS server. Additionally, or alternatively, the process can be based on receiving a timeout message for the second DNS request.

Act 530 includes using the IP address, which was obtained from the LKG cache, to connect the local host with a system associated with the IP address.

In some cases, method 500 can includes some additional acts. For instance, prior to submitting the first DNS request to the DNS server, another act can include submitting an original DNS request to the DNS server, where the original DNS request is a request for the DNS server to resolve the IP address for the domain name. Prior to submitting the first DNS request to the DNS server, another act can include receiving, from the DNS server, an original DNS resolution that resolves the IP address for the domain name. Prior to submitting the first DNS request to the DNS server, another act can include causing the original DNS resolution to be stored in the LKG cache. After submitting the first DNS request to the DNS server and as a part of causing the first DNS resolution to be stored in the LKG cache, another act can include causing the first DNS resolution to replace the original DNS resolution in the LKG cache such that only a most recently used version of a resolution for the IP address is included in the LKG cache.

Accordingly, various aspects of the disclosed principles are triggered when an error condition has occurred. By following the disclosed principles, the embodiments are able to provide DNS resolutions and to potentially help mitigate or eliminate issues that may occur when DNS failures happen.

Example Computer/Computer Systems

Figure 6:
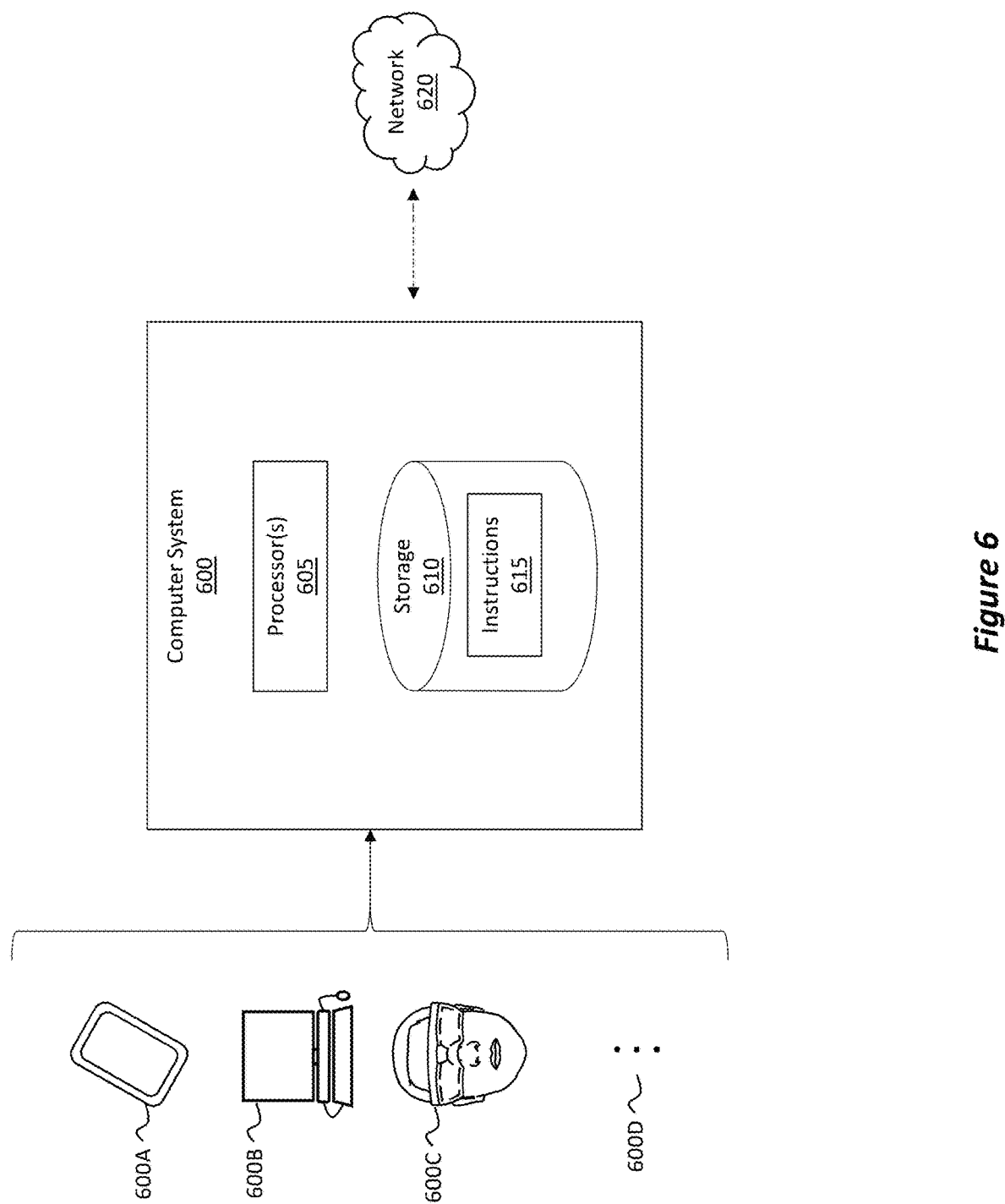
FIG. 6 illustrates an example computer system that can be configured to perform any of the disclosed operations.

Attention will now be directed to FIG. 6 which illustrates an example computer system 600 that may include and/or be used to perform any of the operations described herein. For instance, computer system 600 may be any of the local hosts mentioned herein.

Computer system 600 may take various different forms. For example, computer system 600 may be embodied as a tablet 600A, a desktop or a laptop 600B, a wearable device 600C, a mobile device, or any other standalone device, as represented by the ellipsis 600D. Computer system 600 may also be a distributed system that includes one or more connected computing components/devices that are in communication with computer system 600.

In its most basic configuration, computer system 600 includes various different components. FIG. 6 shows that computer system 600 includes one or more processor(s) 605 (aka a "hardware processing unit") and storage 610.

Regarding the processor(s) 605, it will be appreciated that the functionality described herein can be performed, at least in part, by one or more hardware logic components (e.g., the processor(s) 605). For example, and without limitation, illustrative types of hardware logic components/processors that can be used include Field-Programmable Gate Arrays ("FPGA"), Program-Specific or Application-Specific Integrated Circuits ("ASIC"), Program-Specific Standard Products ("ASSP"), System-On-A-Chip Systems ("SOC"), Complex Programmable Logic Devices ("CPLD"), Central Processing Units ("CPU"), Graphical Processing Units ("GPU"), or any other type of programmable hardware.

As used herein, the terms "executable module," "executable component," "component," "module," or "engine" can refer to hardware processing units or to software objects, routines, or methods that may be executed on computer system 600. The different components, modules, engines, and services described herein may be implemented as objects or processors that execute on computer system 600 (e.g. as separate threads). The processor(s) 605 can be configured to perform any of the disclosed method acts or other functionalities.

Storage 610 may be physical system memory, which may be volatile, non-volatile, or some combination of the two. The term "memory" may also be used herein to refer to non-volatile mass storage such as physical storage media. If computer system 600 is distributed, the processing, memory, and/or storage capability may be distributed as well.

Storage 610 is shown as including executable instructions 615. The executable instructions 615 represent instructions that are executable by the processor(s) 605 of computer system 600 to perform the disclosed operations, such as those described in the various methods.

The disclosed embodiments may comprise or utilize a special-purpose or general-purpose computer including computer hardware, such as, for example, one or more processors (such as processor(s) 605) and system memory (such as storage 610), as discussed in greater detail below. Embodiments also include physical and other computer-readable media for carrying or storing computer-executable instructions and/or data structures. Such computer-readable media can be any available media that can be accessed by a general-purpose or special-purpose computer system. Computer-readable media that store computer-executable instructions in the form of data are "physical computer storage media" or a "hardware storage device." Furthermore, computer-readable storage media, which includes physical computer storage media and hardware storage devices, exclude signals, carrier waves, and propagating signals. On the other hand, computer-readable media that carry computer-executable instructions are "transmission media" and include signals, carrier waves, and propagating signals. Thus, by way of example and not limitation, the current embodiments can comprise at least two distinctly different kinds of computer-readable media: computer storage media and transmission media.

Computer storage media (aka "hardware storage device") are computer-readable hardware storage devices, such as RANI, ROM, EEPROM, CD-ROM, solid state drives ("SSD") that are based on RANI, Flash memory, phase-change memory ("PCM"), or other types of memory, or other optical disk storage, magnetic disk storage or other magnetic storage devices, or any other medium that can be used to store desired program code means in the form of computer-executable instructions, data, or data structures and that can be accessed by a general-purpose or special-purpose computer.

Computer system 600 may also be connected (via a wired or wireless connection) to external sensors (e.g., one or more remote cameras) or devices via a network 620. For example, computer system 600 can communicate with any number devices or cloud services to obtain or process data. In some cases, network 620 may itself be a cloud network. Furthermore, computer system 600 may also be connected through one or more wired or wireless networks to remote/separate computer systems(s) that are configured to perform any of the processing described with regard to computer system 600.

A "network," like network 620, is defined as one or more data links and/or data switches that enable the transport of electronic data between computer systems, modules, and/or other electronic devices. When information is transferred, or provided, over a network (either hardwired, wireless, or a combination of hardwired and wireless) to a computer, the computer properly views the connection as a transmission medium. Computer system 600 will include one or more communication channels that are used to communicate with the network 620. Transmissions media include a network that can be used to carry data or desired program code means in the form of computer-executable instructions or in the form of data structures. Further, these computer-executable instructions can be accessed by a general-purpose or special-purpose computer. Combinations of the above should also be included within the scope of computer-readable media.

Upon reaching various computer system components, program code means in the form of computer-executable instructions or data structures can be transferred automatically from transmission media to computer storage media (or vice versa). For example, computer-executable instructions or data structures received over a network or data link can be buffered in RAM within a network interface module (e.g., a network interface card or "NIC") and then eventually transferred to computer system RANI and/or to less volatile computer storage media at a computer system. Thus, it should be understood that computer storage media can be included in computer system components that also (or even primarily) utilize transmission media.

Computer-executable (or computer-interpretable) instructions comprise, for example, instructions that cause a general-purpose computer, special-purpose computer, or special-purpose processing device to perform a certain function or group of functions. The computer-executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the embodiments may be practiced in network computing environments with many types of computer system configurations, including personal computers, desktop computers, laptop computers, message processors, hand-held devices, multi-processor systems, microprocessor-based or programmable consumer electronics, network PCs, minicomputers, mainframe computers, mobile telephones, PDAs, pagers, routers, switches, and the like. The embodiments may also be practiced in distributed system environments where local and remote computer systems that are linked (either by hardwired data links, wireless data links, or by a combination of hardwired and wireless data links) through a network each perform tasks (e.g. cloud computing, cloud services and the like). In a distributed system environment, program modules may be located in both local and remote memory storage devices.

The present invention may be embodied in other specific forms without departing from its characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A method for implementing a last known good (LKG) client-side cache for domain name system (DNS) resiliency, said method being performed by a local host implementing a DNS client that includes both the LKG cache and a DNS cache, said method being implemented by a dynamic link library that is embedded in an operating system of the local host and comprising:
    submitting a first DNS request to a DNS server, where the first DNS request is a request for the DNS server to resolve an Internet Protocol (IP) address for a domain name that is included in the first DNS request;
    receiving, from the DNS server, a first DNS resolution that resolves the IP address for the domain name;
    determining that an existing DNS resolution, which resolves the IP address for the domain, is already stored in the LKG cache, wherein the existing DNS resolution is stored in the LKG cache with a timestamp;
    while retaining the existing DNS resolution in the LKG cache, updating the timestamp to reflect a time when the first DNS resolution was received, wherein the LKG cache is residing on the local host, and wherein the LKG cache persistently stores the updated timestamp and the existing DNS resolution;
    in addition to updating the timestamp in the LKG cache, storing the first DNS resolution in the DNS cache, which is also residing on the local host, wherein the DNS cache non-persistently stores the first DNS resolution;
    preparing a second DNS request, where the second DNS request is a subsequent request to again resolve the IP address for the domain name, which is included in the second DNS request;
    querying the DNS cache to determine whether the DNS cache still includes the first DNS resolution;
    determining that the DNS cache currently does not include the first DNS resolution;
    submitting the second DNS request to the DNS server;
    in response to determining that a second DNS resolution for the second DNS request has not been received from the DNS server, obtaining the IP address for the domain name from the LKG cache, which persistently stored the existing DNS resolution, wherein the IP address is obtained using the existing DNS resolution, wherein the IP address is obtained based on a determination that the existing DNS resolution is fresh based on the updated timestamp, and wherein determining that the existing DNS resolution is fresh based on the updated timestamp includes determining that an age of the timestamp does not exceed an age as specified by an eviction policy; and
    using the IP address, which was obtained from the LKG cache, to connect the local host with a system associated with the IP address.

2. The method of claim 1, wherein the LKG cache is a least recently used (LRU) cache.

3. The method of claim 1, wherein determining that the second DNS resolution for the second DNS request has not been received from the DNS server is based on receiving an error message from the DNS server.

4. The method of claim 1, wherein determining that the second DNS resolution for the second DNS request has not been received from the DNS server is based on receiving a timeout message for the second DNS request.

5. The method of claim 1, wherein:
    a service stores the first DNS resolution in the LKG cache,
    the service is a dynamic link library (DLL) that is embedded in an operating system (OS) of the local host,
    the DLL is invoked in response to determining that the second DNS resolution for the second DNS request has not been received, and the DLL obtains the IP address for the domain name from the LKG cache.

6. The method of claim 1, wherein a service stores the first DNS resolution in the LKG cache, and wherein the service is triggered to obtain the IP address for the domain name from the LKG cache only in response to said determination that the second DNS resolution for the second DNS request has not been received.

7. The method of claim 1, wherein the method further includes:
prior to submitting the first DNS request to the DNS server, submitting an original DNS request to the DNS server, where the original DNS request is a request for the DNS server to resolve the IP address for the domain name;
prior to submitting the first DNS request to the DNS server, receiving, from the DNS server, an original DNS resolution that resolves the IP address for the domain name; and
prior to submitting the first DNS request to the DNS server, causing the original DNS resolution to be stored in the LKG cache, wherein the original DNS resolution is said existing DNS resolution.

8. The method of claim 1, wherein determining that the second DNS resolution for the second DNS request has not been received from the DNS server includes one or more of:
determining a reachability issue exists with regard to reaching the DNS server; determining a response failure has occurred; determining a response delay has occurred; or determining a configuration error has occurred.

9. The method of claim 1, wherein a timestamp is provided for each DNS resolution included in the LKG cache.

10. A computer system configured to implement a last known good (LKG) client-side cache for domain name system (DNS) resiliency, said computer system being a client-side, local host implementing a DNS client that includes both the LKG cache and a DNS cache, said computer system comprising:
one or more processors; and
one or more computer-readable hardware storage devices that store instructions that are executable by the one or more processors to cause a dynamic link library that is embedded in an operating system of the computer system to:
submit a first DNS request to a DNS server, where the first DNS request is a request for the DNS server to resolve an Internet Protocol (IP) address for a domain name that is included in the first DNS request;
receive, from the DNS server, a first DNS resolution that resolves the IP address for the domain name;
determine that an existing DNS resolution, which resolves the IP address for the domain, is already stored in the LKG cache, wherein the existing DNS resolution is stored in the LKG cache with a timestamp;
while retaining the existing DNS resolution in the LKG cache, update the timestamp to reflect a time when the first DNS resolution was received, wherein the LKG cache is residing on the local host, and wherein the LKG cache persistently stores the existing DNS resolution and the updated timestamp;
in addition to updating the timestamp in the LKG cache, store the first DNS resolution in the DNS cache, which is also residing on the local host, wherein the DNS cache non-persistently stores the first DNS resolution;
prepare a second DNS request, where the second DNS request is a subsequent request to again resolve the IP address for the domain name, which is included in the second DNS request;
query the DNS cache to determine whether the DNS cache still includes the first DNS resolution;
determine that the DNS cache currently does not include the first DNS resolution;
submit the second DNS request to the DNS server;
in response to determining that a second DNS resolution for the second DNS request has not been received from the DNS server, obtain the IP address for the domain name from the LKG cache, which persistently stored the existing DNS resolution, wherein the IP address is obtained using the existing DNS resolution, wherein the IP address is obtained based on a determination that the existing DNS resolution is fresh based on the updated timestamp, and wherein determining that the existing DNS resolution is fresh based on the updated timestamp includes determining that an age of the timestamp does not exceed an age as specified by an eviction policy; and
use the IP address, which was obtained from the LKG cache, to connect the local host with a system associated with the IP address.

11. The computer system of claim 10, wherein resolutions between IP addresses and domain names are addable asynchronously to the LKG cache.

12. The computer system of claim 10, wherein an eviction policy is provided for the LKG cache, and wherein the eviction policy governs how frequently entries in the LKG cache are evicted.

13. The computer system of claim 10, wherein a timestamp is provided for each DNS resolution included in the LKG cache.

14. The computer system of claim 10, wherein the LKG cache is separate from an operating system (OS) DNS cache.

15. A method for implementing a last known good (LKG) client-side cache for domain name system (DNS) resiliency, said method being performed by a local host implementing a DNS client, that includes both the LKG cache and a DNS cache said method being implemented by a dynamic link library that is embedded in an operating system of the local host and comprising:
submitting a first DNS request to a DNS server, where the first DNS request is a request for the DNS server to resolve an Internet Protocol (IP) address for a domain name that is included in the first DNS request;
receiving, from the DNS server, a first DNS resolution that resolves the IP address for the domain name;
determining that an existing DNS resolution, which resolves the IP address for the domain, is already stored in the LKG cache, wherein the existing DNS resolution is stored in the LKG cache with a timestamp;
while retaining the existing DNS resolution in the LKG cache, updating the timestamp to reflect a time when the first DNS resolution was received, wherein the LKG cache is residing on the local host, and wherein the LKG cache persistently stores the existing DNS resolution and the updated timestamp;

in addition to updating the timestamp in the LKG cache, storing the first DNS resolution in the DNS cache, wherein the DNS cache non-persistently stores the first DNS resolution;

preparing a second DNS request, where the second DNS request is a subsequent request to again resolve the IP address for the domain name, which is included in the second DNS request;

querying the DNS cache to determine whether the DNS cache still includes the first DNS resolution;

determining that the DNS cache currently does not include the first DNS resolution;

submitting the second DNS request to the DNS server;

in response to either an error message or a timeout message, obtaining the IP address for the domain name from the LKG cache, which persistently stored the existing DNS resolution, wherein the IP address is obtained using the existing DNS resolution, wherein the IP address is obtained based on a determination that the existing DNS resolution is fresh based on the updated timestamp, and wherein determining that the existing DNS resolution is fresh based on the updated timestamp includes determining that an age of the timestamp does not exceed an age as specified by an eviction policy; and using the IP address, which was obtained from the LKG cache, to connect the local host with a system associated with the IP address.

16. The method of claim 15, wherein the LKG cache is asynchronously hydrated with resolutions between IP addresses and domain names.

17. The method of claim 15, wherein determining that the existing DNS resolution is fresh based on the updated timestamp includes determining that an age of the timestamp does not exceed an age as specified by an eviction policy.

18. The method of claim 17, wherein the age specified by the eviction policy is 5 days.

19. The method of claim 17, wherein DNS resolutions in the LKG cache whose timestamps are older than the age specified by the eviction policy are removed from the LKG cache.

20. The method of claim 15, wherein said method is implemented by a dynamic link library that is embedded in an operating system of the local host.

* * * * *